(12) United States Patent
Garber et al.

(10) Patent No.: US 6,636,793 B2
(45) Date of Patent: Oct. 21, 2003

(54) MEASURING DEVICE FOR TAKING AT LEAST ONE MEASURE OF A BUBBLE FILED WITH A MEDIUM

(75) Inventors: Roland Garber, Memmingen (DE); Richard Moser, Tannheim (DE); Steffen Colditz, Untrasried (DE)

(73) Assignee: ASF Thomas Industries GmbH, Memmingen (DE)

(*) Notice: Subject to any disclaimer, the term of this patent is extended or adjusted under 35 U.S.C. 154(b) by 0 days.

(21) Appl. No.: 10/026,619

(22) Filed: Dec. 27, 2001

(65) Prior Publication Data

US 2002/0079726 A1 Jun. 27, 2002

(30) Foreign Application Priority Data

Dec. 27, 2000 (DE) .................................... 200 21 994 U
Mar. 23, 2001 (DE) .................................... 201 05 098 U
Oct. 10, 2001 (DE) .................................... 201 16 588 U

(51) Int. Cl.⁷ ............................ G01F 23/00; G06F 17/00
(52) U.S. Cl. ........................ 701/45; 701/49; 280/730.1
(58) Field of Search ................... 701/45, 49, 1, 701/36; 280/729, 730.1, 734, 736, 737, 738, 743.1, 743.2; 180/271, 272, 273; 297/284.6, 284.3, 314

(56) References Cited

U.S. PATENT DOCUMENTS

| 3,777,697 A | | 12/1973 | Woessner | 116/118 |
| 5,772,281 A | * | 6/1998 | Massara | 297/284.4 |
| 5,823,045 A | | 10/1998 | Van Driel et al. | 73/299 |
| 5,868,466 A | * | 2/1999 | Massara et al. | 297/284.6 |
| 5,967,608 A | * | 10/1999 | Van Sickle | 297/284.6 |
| 6,098,000 A | * | 8/2000 | Long et al. | 701/49 |

FOREIGN PATENT DOCUMENTS

| DE | 3613906 A1 | 10/1987 |
| DE | 9103273.3 | 8/1991 |
| DE | 4016872 A1 | 11/1991 |
| DE | 4233746 C1 | 4/1993 |
| EP | 0289165 A1 | 11/1988 |

* cited by examiner

*Primary Examiner*—Tan Q. Nguyen
(74) *Attorney, Agent, or Firm*—Jacobson Holman PLLC

(57) ABSTRACT

A measuring device for taking at least one measure or one dimension of a bubble filled with a medium and a system for adjusting a surface contour and a system for detecting the surface load, in particular in seats. The measuring device includes a feeler which rests against the skin of the bubble and cooperates with a sensor for determining the respective position of the feeler with respect to a reference point and outputting the corresponding value.

62 Claims, 3 Drawing Sheets

MEASURING DEVICE FOR TAKING AT LEAST ONE MEASURE OF A BUBBLE FILED WITH A MEDIUM

BACKGROUND OF THE INVENTION

The invention relates to a measuring device for taking at least one measure of a bubble (for example a flexible-walled inflatable cell or container such as a bag, cushion or the like) filled with a medium, to a system for adjusting a surface contour consisting of an arrangement of fillable bubbles or a seat with a system consisting of a number of bubbles for changing the contour of a seat surface.

To measure the expanse of a bubble filled with a medium (for example gas), the pressure of the gas (or of the medium in general) located in the bubble is generally measured.

However, as the volume is very markedly dependent on temperature and/or load, the external dimensions of the bubble cannot be determined or adjusted exactly. Furthermore, known arrangements assume that the bubbles are as tight as possible.

It is known to provide the seat surface (seat pan and/or backrest) of car seats with air or liquid cushions to increase comfort, the surface contour of the seat being changed by appropriate filling of these cushions (i.e. bubbles). Owing to the very great temperature variations in a vehicle, the volume of these air cushions changes to the extent that it is necessary to readjust the air cushions in each case. This may be carried out manually, by opening valves and optionally switching on a pump, or electronically using a control means which readjusts the preset pressure or the necessary volume within a bubble. A drawback of these known arrangements is that the surface contour, which corresponds to a measurable distance, is determined indirectly via the pressure, so additional disturbances can distort the result.

European patent application 289 165 is known from the state of the art. This document proposes two fork-type feelers which are articulated and act on the bubble from the exterior. These feelers transpose the dimensions taken from the bubble to a slider acting on a stationary switch. The switch is actuated if the bubble volume is too small. A drawback of this design is the relatively imprecise recording of the distance, owing to the slot guide required. Furthermore, the system is completely unsuitable for use as a measuring device because the switch detects only a limit value and a corresponding signal is then activated.

U.S. Pat. No. 5,823,045 is also known from the state of the art. This document describes a volume-measuring device in which a displaceable piston determines the volume of a bubble which may be filled with a medium. As the volume is to be determined, the piston has to rest as extensively as possible on the bubble and therefore distorts the resultant dimension (distance as dimension). Moreover, the arrangement is totally unsuitable for producing a measuring device, in particular in a motor vehicle seat. It is used only to display a certain capacity and not for precise determination of quantity.

SUMMARY OF THE INVENTION

It is an object of the invention to provide a measuring device for taking at least one measure of a bubble filled with a medium, the measure being determined independently of the external temperature and other spurious influences.

For achieving the object of the invention, a measuring device for taking at least one measure or one dimension of a bubble filled with a medium is proposed, comprising at least one feeler which rests against the skin of the bubble or is embedded in the skin or in the material surrounding the bubble skin. The object is achieved according to the invention in that the feeler cooperates with a sensor which determines the respective position of the feeler relative to a reference, such as a reference point or a reference area, and outputs a value or information corresponding to the detected distance between the feeler and the reference area or the reference point.

The proposal according to the invention produces a dimensional value which is independent of the pressure prevailing in the bubble, more specifically over the entire interval of the width to be measured or of the measure. The proposal according to the invention accordingly provides a measuring device which basically cooperates with a more complex system, for example a servo loop for appropriate determination of the surface contour of the seat.

The invention proposes that the feeler rests against the skin of the bubble and is embedded in the skin or in the material surrounding the bubble skin. The measuring device is used, for example, in a more complex application for determining the seat contour or the surface loading of a seat. It is useful to determine the change in measure on the seat surface brought about by the bubble, optionally at a certain distance from the actual bubble. However, this measured value is dependent on the expanse or dimension of the bubble. If the feeler is introduced into the material surrounding the bubble, it can, in a preferred embodiment, determine, in particular, the change in measure directly on the appropriate seat surface owing to the change in the dimensions of the bubble.

Furthermore, the measuring device is not designed merely to provide an appropriate distance value corresponding to the dimensions of the bubble. In various applications, it is also sufficient if the loading information is produced by the measuring device, in other words the measuring device merely displays whether or not, for example, the seat is loaded, i.e. occupied. In this case, the function of the measuring device may be reduced to a "switch function", the value 1, for example, being output when the seat is loaded and the value 0 being output when the seat is unloaded. This information may be established, for example, by comparison of these two positions. The measuring device according to the invention is also used in this case, but the result obtained is processed in a different way.

A further advantage of the invention is that the measuring device operates in the bubble, independently of leaks. As the appropriate distance, rather than the pressure, is measured directly, possible leaks are immaterial. Therefore, a leak does not distort the measured result.

The invention proposes a plurality of variants. On the one hand, it is proposed that the feeler rests on the bubble skin either on the outer side or on the inner side thereof, or is embedded therein, for example welded, stuck or otherwise integrated or incorporated. In addition, the feeler acts either together with a reference point which is stationary as such or with a reference point which, in turn, is also arranged movably on the bubble skin. Reference area and reference point are synonymous and equivalent. Depending on the geometric layout of the measuring device, the term reference area (for example, a reference surface or plane) or reference point is used. The concept of the invention may obviously also be incorporated in a material surrounding the bubble skin. This allows the change in dimensions in the interior of a seat, originating from the bubble, to be determined and evaluated directly on the surface facing the person sitting on the seat. The invention is not restricted to a specific design.

As already mentioned, the reference area/point used to determine the distance may be designed as a feeler which rests on or against the bubble skin. Therefore, a symmetrical arrangement of the two feelers which may be designed, for example, as a measuring fork or measuring device, is basically possible. Conversely, however, it is also possible to provide a substantially immobile contact area as reference area, in which case the contact area may be, for example, a housing wall or the like.

In a variant, mechanical feelers are guided manually to the outer skin of the filled bubble and a corresponding dimension (for example distance, etc.) of the bubble thus measured mechanically. In an inexpensive design, this is a simple type of sliding caliper with which the dimension of the bubble is determined. However, a type of switch which is actuated from the outer skin of the bubble may also be used. Electrical, electromechanical, magnetic, electromagnetic or electronic feelers or sensor devices are also conceivable and output individual values to a control means according to position, so the measured variable may be determined.

However, as it is impossible, with rigidly installed bubbles, to measure the thickness of the bubbles manually each time they are filled, it is proposed to arrange at least two feelers securely on the bubble skin. The distance between these feelers may be measured in various ways, for example by mechanical, electronic, optical or even pressure-dependent measuring devices or other (electronic or electromechanical) sensor devices.

The feelers may be arranged on the exterior of the bubble skin or also on the interior thereof. Alternatively, an arrangement externally and internally on the bubble skin is conceivable.

In a preferred embodiment of the invention, it is proposed that the feelers are each arranged on at least two mutually connected fork-type limbs. In this case, each limb carries a feeler. The arrangement may be set out in such a way that the feelers feel the internal bubble wall inside the bubble or rest against the external bubble skin from the exterior and thus determine the corresponding value.

There are also several possibilities for the mutual arrangement of the limbs. In a variant according to the invention, the limbs are rigidly connected to one another and the feeler rests on the bubble skin while utilizing the internal stress of the limb. The limb has a corresponding internal stress in the region of contact with the other limb, but the limb is otherwise rigid so as not to distort the measured value. Alternatively, the limbs may be connected to one another in an articulated manner. This may easily be achieved by means of a small film hinge or hinge in the intermediate region between the two limbs.

In a preferred embodiment of the invention, contact or bias means are provided (for example a spring or the like) which are arranged on the limb and cause the feeler to rest on the bubble skin. With this variant according to the invention, a corresponding internal stress of the limbs is no longer required as it may be achieved by a separate, generally inexpensive, component, namely a contact means (a spring, a leaf spring and the like). An articulated arrangement of the limbs is an inexpensive variant.

In a preferred embodiment of the invention, the bubble skin comprises a lug as contact means for guiding the limb. The contact means designed as a lug again allows reliable contact between the limb and the bubble skin and therefore measurement which is basically exact. However, the lug also allows the limb to be fixed, at least with respect to one degree of freedom, in other words the lug also guides the limb within the bubble. The lug is so designed that the limb can still slide therein, the sliding movement being required for picking up the measured value reliably and exactly, as the geometric coordinates can always change relative to one another during a movement of the bubble and sliding of the feeler on the bubble skin is necessary. Additional contact means such as a spring and the like may easily be dispensed with in this case, so the cost of the measuring device is considerably reduced and the lug is injection molded, stuck or welded onto the bubble in a simple manner.

To avoid disturbing measurement or damaging the bubble, it is proposed in a further variant of the invention that the limb be bent back in the end region carrying the feeler in such a way that the end is removed from the bubble skin. This reliably prevents hooking of the limb in the bubble skin. As the limb cannot hook, measurement is not disturbed and damage to the bubble skin is also reliably avoided.

Substantially any known materials may be used as material for the limb carrying the feeler. Plastics materials, fiber-reinforced plastics materials (glass-fiber or carbon-fiber-reinforced plastics materials), metals, metal alloys, spring steel or also combinations of the aforementioned materials may be used as material for the limb carrying the feeler. The use of fiber-reinforced plastics materials or spring steel leads, in particular, to material with a certain inherent stress which helps the limb to rest automatically on the bubble skin.

In a further variant of the invention, it is proposed that the feelers are arranged on a scissor-like arm. The two arms are optionally connected to one another in an articulated manner and, at a different point, carry the sensor for picking up the corresponding signal. A scissor-like arrangement also allows the measuring device to be arranged, for example, on the exterior of the bubble.

In a first embodiment of a mechanical device for measuring the distance between the feelers, the feelers are arranged on at least two limbs which are connected to one another in an articulated manner, the feelers embracing the bubble. The distance between the feelers may be determined by measuring the angle enclosed by the limbs and the known distance of the feelers from the articulation. In a further variant, it is also possible to measure the distance between the limbs in the vicinity of the articulation and, as this distance is directly proportional to the distance between the feelers (depending on the limb length), the thickness of the bubble may in turn be calculated.

In a second embodiment of the invention, the feelers are mounted displaceably on a guide and the measure of the bubble is determined from the distance of the feelers on the guide. It is advantageous to arrange the feelers on limbs which, in turn, are mounted displaceably on the guide in the manner of a sliding caliper, and it is easier to read the measure of the bubble from the guide.

The distance between the feelers may also be determined electronically with these aforementioned aids. In this case, the angle of aperture between the mutually articulated limbs is determined in that a Hall-effect sensor or a capacitive sensor is arranged in the vicinity of the articulation so that the distance between the feelers may be determined by the distance known therefrom. It is also possible to connect the limbs of the angle to a potentiometer and to determine this distance on the basis of the resistance resulting from the potentiometer. The distance between the feelers may in turn be calculated therefrom. It is also possible to connect the limbs of the angle to a strain gauge which displays a different value according to the extension. In a further variant of the invention, it is proposed that a piezocrystal be used as sensor. The moving feeler acts on the piezocrystal and converts the load acting on the crystal and corresponding to the dimension into an electronically evaluatable signal such as a voltage.

It is also proposed according to the invention that not only the angle of aperture between the two limbs but also the opening distance between the two arms at a defined point be determined. According to the law of radiation, the actual distance between the two feelers may be determined easily if the distance in the region of the articulation or of the joint between the two limbs is known.

The invention proposes various sensors which may be used in the measuring device according to the invention. Basically any sensors used for measuring a distance are suitable. It has proven expedient to use a Hall-effect sensor which cooperates with a magnet. In this case, the two elements of the sensor, the Hall-effect sensor and the magnet, are each arranged on one of the two limbs or on one limb and the reference area or the reference point. It has proven advantageous to use the Hall-effect sensor because, on the one hand, it is convenient to produce and, on the other hand, it produces a relatively accurate, easily repeatable signal which is not susceptible to interference.

Furthermore, it is possible to use a strain gauge. It is also possible to use inductive proximity switches which also operate without contact. It is also possible to use laser displacement pickups with which a laser beam is reflected from the feeler and the distance calculated via the angle reference. It is also possible to use a capacitive proximity switch equipped with an oscillator which changes its oscillation behavior when it approaches an object. It is also possible to use ultrasonic sensors, the sound pulses being reflected on boundary layers and the pulse running time being converted into distance. Finally, an eddy current distance pickup or displacement pickup is also proposed. Owing to a change in magnetic flux in a body as this body approaches a magnetic field, voltage is induced due to the law of induction and may be picked off as a displacement or measurement signal. It is also conceivable to use a thermal mass flow meter (for example in the case of bubbles filled with liquids) to measure the distance. It is possible to use various sensors in the measuring device according to the invention, the various sensors having different characteristics and being selected for optimization.

The connection of Hall-effect sensors with magnets as sensor for distance measurement has proven to be insensitive to spurious influences, durable and inexpensive.

Sensors are generally understood to be not just one component but a plurality of elements which belong to the sensor (or to the sensor devices). When the sensor is designed as a Hall-effect sensor, the sensor obviously comprises the magnets in addition to the Hall-effect sensor. Other sensors do not require corresponding additional elements if they operate, for example, by reflection.

In a further variant of the invention, it is proposed that the strain gauge is arranged at least on one limb of the feeler and measures the bending of the limb. Depending on the geometric configuration it may be necessary, owing to the use of the strain gauge, to measure relatively small changes in displacement for which it is very desirable to use the strain gauge. For example, the easy bending of the limb of the feeler may be determined by the strain gauge and a measure of the desired dimension be derived herefrom, with appropriate choice and consideration of the geometry.

The same methods of electronic measurement may also be used in the second above-mentioned embodiment.

Optical or acoustic distance measurement is also possible, in which case the feeler is arranged, in particular, in the interior of the bubble and the distance between these feelers can be determined by transmission and reception of signals. A frequency generator is accordingly arranged on one side of the bubble skin and a transducer or a reflector on the opposite side of the bubble skin to reflect the optical or acoustic signals and transmit them to a frequency pick-up arranged on the bubble skin on the same side as the frequency generator.

It is also possible to equip the feelers with a pressure sensor which presses against an abutment and allows a reproducible value to be determined according to the pressure of the bubble skin against the pressure sensor. The pressure is independent of external temperature.

The entire measuring device is advantageously arranged inside the bubble so it is accommodated compactly and securely and does not impair the comfort of the seat.

It is sufficient to measure the bubbles in only one dimension. In other cases, however, it is worth measuring the values of the other two dimensions. This necessitates a further measuring device which is oriented, for example, at right angles to the first one.

In a preferred embodiment of the invention it has been found that the sensor is arranged between the two limbs holding the feelers. It is therefore possible, with an appropriate geometric arrangement, to utilize the set of rays to determine the actual distance between the two feelers or the actual dimension of the bubble. It is desirable that the sensor is arranged at the connection region of the limbs or at the articulation thereof. To avoid distortion of measurement, in particular, a torsion-free limb is proposed.

According to the invention, the sensor need not necessarily be provided on the feeler arranged on the bubble skin as the sensor can also be arranged on the limb carrying the feeler. For the design of the invention, it is immaterial whether the Hall-effect sensor or the magnet is arranged on the limb or the reference area. The kinematic arrangement is interchangeable, as desired, and corresponds to the invention. It is also proposed in a variant of the invention that the feeler itself forms the sensor. This may be advantageous, in particular, if feeler and sensor are designed in an integrated manner. For example, the feeler is located on the surface of the bubble and contains the sensor which performs a distance measurement, for example to a corresponding reference area.

It is desirable if the sensor and/or the magnet is stuck or clipped or injected on or around the limb or on the bubble skin. This design ensures a secure connection which can also be mass produced in an economical manner.

In an embodiment of the invention, the skin of the bubble consists of an elastic material similar to that of an air balloon, which allows uniform expansion in all directions.

This choice of material allows the bubble skin to be tensioned continuously, even with a small filling, and unevenness on a seat surface is thus avoided.

With this embodiment of the invention, it is desirable, for achieving a certain surface contour, to determine the diameter or the dimension of the individual bubbles. In a further embodiment of the invention, a non-elastic material similar to that of an air bed, is used for the bubble skin. This has the advantage that the external contour of the bubble is changed only slightly when the bubble is overfilled with the medium.

The pressure in the bubble increases. To enable the expansion of the bubble to be defined better, the bubble may be received in a mould which allows expansion in only one direction toward the seat surface.

According to one embodiment of the invention, the bubble is placed in individual compartments with rigid external walls as a mould, these compartments being open in the direction of the seat surface and the filled bubble skin bulging from the compartment.

In a further variant of the invention, the lateral walls and the base part themselves are produced from non-elastic material and only the cover from an elastic material. This design simplifies detection of the thickness of the bubbles as one of the feelers adopts a fixed position on the base part of the bubble and only the other feeler covers a distance as the bubble is filled. The measuring device can therefore be substantially simpler in design because, when using the design according to example one, only one limb, of which the angle to the plane of the bubble base part is measured has to be used.

For reliable operation of the measuring device, it is proposed that the limb carrying the feeler is fastened in the bubble, in particular in the bubble wall. A corresponding attachment, for example of film or in one material, like the material of the limb, is provided on the arm or the pair of arms and may be incorporated, stuck, welded or otherwise fastened in the bubble or the edge of the bubble. The limb designed as a measuring fork is therefore fixed in the bubble.

Data lines are available for reading out the values delivered by the sensor, and it may also be necessary to guide a power supply through the bubble skin to the sensor devices inside the bubble. It is also possible to provide cordless evaluation of the values from the bubble. The incorporation of a "weak point" in the bubble skin is therefore avoided as a tight bubble is obviously desired.

In addition to incorporating the data lines or supply lines in the bubble skin, it is also proposed to provide tube bushings which are incorporated tightly in the bubble skin to hold data lines and the like.

The invention similarly also relates to a system for adjusting the surface contour, in particular of a seat. The aforementioned systems are used in motor vehicle seats, for example to provide different surface contours, for example for different drivers and pronounced use of the seat. Known solutions operate by evaluating the pressure prevailing in the bubble. As this mode of operation is, in particular, dependent on temperature, these systems are relatively imprecise. A further object of the invention is therefore to provide a system, as described hereinbefore, which is as independent as possible from external temperature and other spurious influences.

A system for adjusting a surface contour, in which one or more bubbles are arranged under the surface and at least one bubble is provided with a measuring device, has been proposed for achieving this object. Advantageously, the measuring device is provided with a control means, or vice versa, the control means with a measuring device, so filling and emptying of the bubble with or of a medium can be controlled irrespective of the value of the measurement. The actual value determined by the measuring device is compared with a set value, as input into the control means for example by appropriate servo elements (potentiometer or data store), and the control means attempts to bring the actual value into line with the set value. As this system for adjusting the surface contour is not dependent on pressure, the system is basically independent of temperature influences and external loads, only the actual positioning of the bubble skin affecting adjustment of the surface contour. The bubbles are filled and/or emptied via a pump or a central air supply (for example compressed air for brakes, etc.). The supply may be interrupted or continued by means of valves.

According to the invention, it is not essential for every bubble of the arrangement to have a measuring device, the control means cooperating with one or a few measuring devices for controlling a plurality of bubbles and accordingly extrapolating the corresponding values for bubbles not provided with a measuring device or determining them empirically (by comparison with the data store).

In the embodiment of the invention, one or more bubbles may be filled with the medium or emptied. In this arrangement, it is not necessary for all bubbles also to have a measuring device. It is also possible to provide mere measurement bubbles, in other words, bubbles which receive a measuring device but are not themselves connected to an external air supply for changing the degree of filling. Alternatively, bubbles may also be provided with a measuring device and means for filling or emptying the bubble.

In a preferred embodiment of the invention, the control means comprises a timer, and a deviation picked up by the measuring device, between the actual value and the set value forming the basis of control, leads to activation of pumps and/or valves once the timer has been processed (delayed). An excessively brief reaction of the system is avoided; for example, if a bubble is relaxed briefly, the dimensions are not changed automatically by introducing or discharging medium but appropriate steps are taken after a certain residence time. The comparison of set and actual value is obviously continued in the meantime to prevent activation of the pump, if necessary, for example if set value and actual value approach one another again.

In a further variant of the invention, each bubble is provided with its own pump and a valve, so each bubble can be activated individually. A gas, gaseous mixture or a liquid is provided as medium for filling the bubbles, air being particularly suitable as it can be taken directly from the environment. A particular gas, a gaseous mixture or a liquid, for example, would have to be kept in a storage container. A feature of these media, however, is that their coefficient of expansion is possibly smaller than that of air, so their volume changes to a lesser extent due to variations in temperature.

The invention also comprises a system for detecting a surface load. It is often desirable to enquire whether a surface, for example the seat pan or the backrest of a seat, is being used, in other words whether a person or an object is resting on it, as a basis, for example, for taking further steps. The system according to the invention for detecting a surface load uses a measuring device to determine distance information. In particular, the measuring device according to the invention may be used as measuring device, but it is also possible to use a different measuring device which does not utilize a bubble. In this case, the system is so designed that a monitoring unit, which may be identical or partially identical to the general control means or is designed separately from it for example, outputs the change in distance value and/or load information brought about by the change of contour from the measuring device. It is thus possible to run further scenarios in the control means or monitoring unit, if corresponding information about the seat pan load is known. In addition, pressure and/or temperature in the bubble can obviously also be determined or other parameters evaluated.

The monitoring unit is constructed as part of the control means or as an autonomous standalone unit, in which case it transmits corresponding information to a primary control means or other elements, or is dependent thereon.

The invention also claims a seat with means for changing the contour of the seat surface facing the body and a measuring device for determining this surface contour. The seat consists of a seat pan with a backrest arranged thereon, and bubbles which may be filled with a medium and are arranged on the side facing the body or, in a further embodiment, below the seat surface in the seat itself are provided as means for changing the contour. The contour of the seat surface may be changed and adapted to the body sitting thereon, depending on the extent to which the bubbles are filled with the medium.

In a preferred embodiment of the invention, a control means or the monitoring unit determines, by evaluating the value or the information output by the measuring device, optionally while considering the pressure prevailing in the bubble and optionally the temperature, how the seat is being stressed, in that the control means compares the various parameters with parameter sets input in a parameter store and the parameter sets are provided with various stress profiles. This embodiment enables various stress profiles to be detected and also enables various procedures to be initiated as a function of these various profiles. These procedures may involve, for example, corresponding evaluation to decide, for example, whether an adult or a child is loading the seat or whether a beer crate or a person is occupying the seat. Different scenarios may in turn be run on the basis of this information. For example, a belt tensioner or an air bag may be appropriately activated if it is obvious whether a child or an adult is occupying the seat. The range of applications is almost limitless.

To achieve this result, the invention proposes that the values output by the measuring device are correspondingly processed and compared with parameter sets filed in a parameter store, so the appropriate stress profile is provided.

In a different application by the same applicant, a system for changing the surface contour of seats is proposed which allows uniform filling of all bubbles and targeted filling of individual bubbles. It should also be possible to change the contour by pumping the medium from one bubble to another or by venting individual bubbles, while other bubbles are optionally filled simultaneously. To produce a reproducible contour, however, it is necessary to detect the thickness of the individual bubbles, to store the value and to relay it to a control means. A measuring device as claimed but also measuring devices which measure only the volume or the pressure of the medium in the bubble, etc. is also suitable for this purpose.

DETAILED DESCRIPTION

Figure 1:
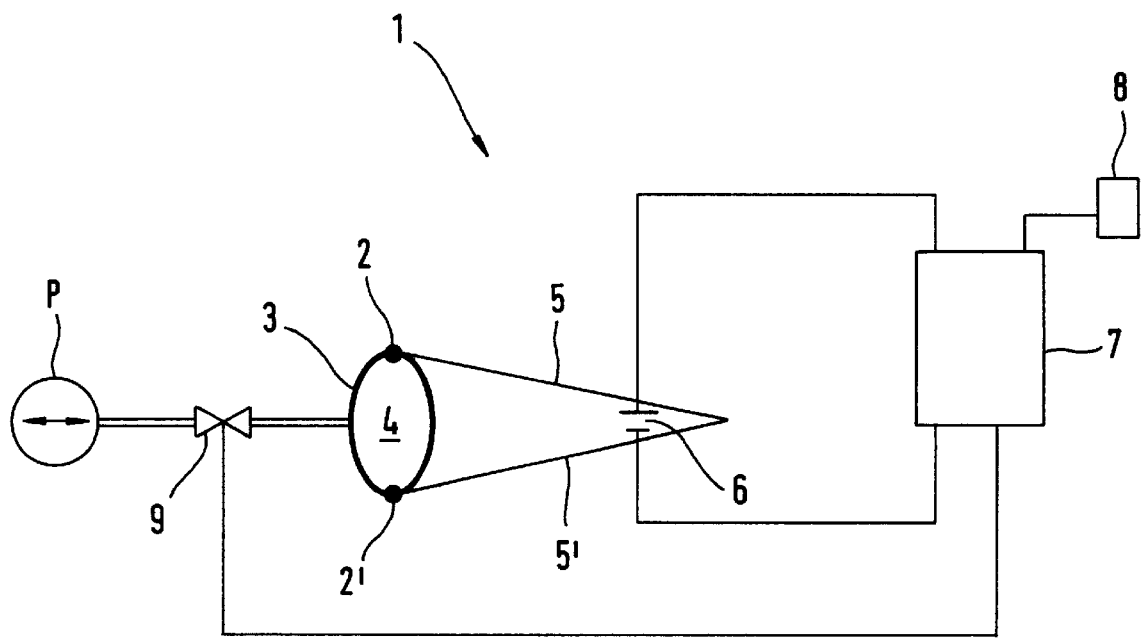
FIG. 1 is a schematic block diagram of the invention.

A measuring device 1 according to the invention is shown in the drawing in FIG. 1. A bubble which is guided by a pump P via a valve 9, for example a solenoid valve, is designated by reference number 4. The pump P may also extract the medium located in the bubble 4 again. A single-acting pump is therefore sufficient for filling the bubble, which is emptied by opening a valve 9 or by using a double-acting pump with pumping and suction action.

Two diametrically opposed feelers 2, 2' are arranged on the bubble 4. In this case they are arranged on the exterior of the bubble skin 3. These feelers 2, 2' are connected to two limbs 5, 5' which enclose a variable angle. A sensor 6 which measures the distance between the limbs 5, 5' at this point is provided in the vicinity of the articulation. The diameter of the bubble 4 between the feelers 2, 2' may be calculated on the basis of the known limb length between the measuring points of the sensor 6 and the feelers 2, 2'. This value of the sensor 6 is relayed to a control means 7 which, in turn, switches the valve 9 connecting the pump P to the bubble 4. The value output by the sensor 6 is advantageously stored in a memory 8 (memory function) so the size of the bubble 4 may be produced in a repeatable manner. This method of measurement is independent of temperature and load.

A measuring device 1 of this type is intended, in particular, for use in seats, including seats for motor vehicles, a plurality of bubbles being introduced in the seat cushion in both the back part and the seat region, so the surface contour can be changed. The seat contour may be changed by differing inflation of bubbles introduced into the seat, for adaptation to the individual driver, in particular to support the lower spine or lumbar region which may be particularly beneficial for a driver suffering from lordosis. Each bubble is provided with its own measuring device.

However, this arrangement of bubbles and measuring devices can also be used outside a seat, for example in a mat which may be laid over a conventional seat, the method of measurement remaining the same as described.

Figure 2:
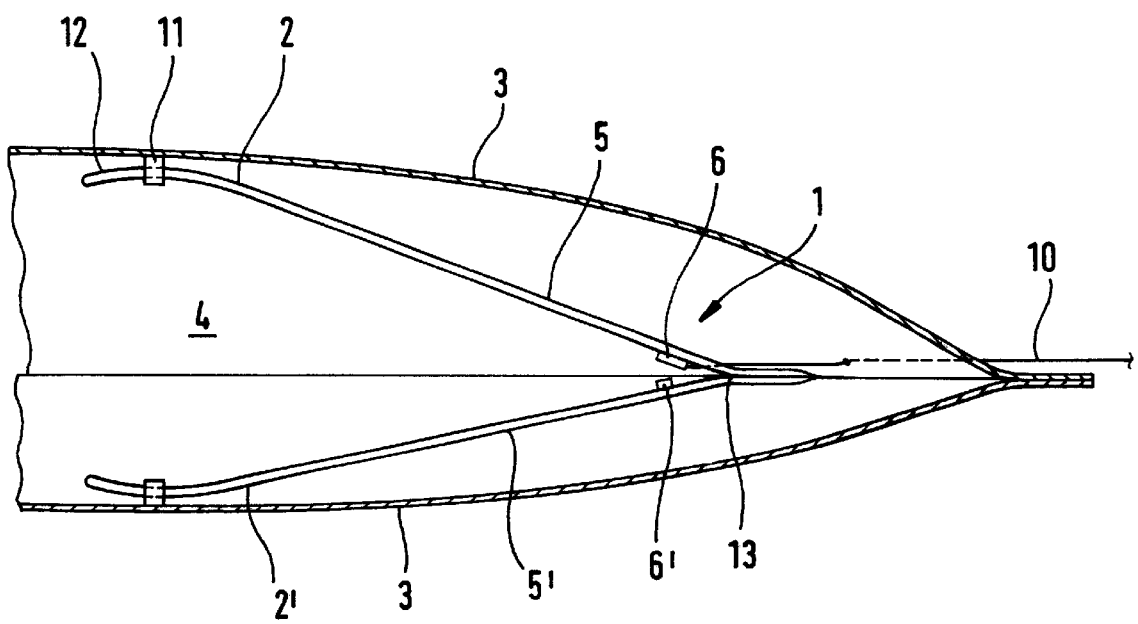
FIG. 2 is a three-dimensional detail of the measuring device according to the invention.

FIG. 2 shows a possible embodiment of the invention. The fully-equipped measuring device 1 is located inside the bubble 4 which is shown partly in section here and is limited by the bubble skin 3. In the embodiment illustrated here, the measuring device 1 consists of two limbs 5, 5' arranged at an angle to one another. The two limbs are connected to one another in the articulation 13. On the one hand, a pivotal joint or articulation may be provided here, or the articulation may be produced by the inherent flexibility of the material of the limbs 5, 5'. The sensor 6, 6' is arranged in the region of the articulation 13. As already mentioned, the sensor 6, 6' can consist of a plurality of elements here and, in the embodiment shown here, it consists of the Hall-effect sensor 6 and the associated magnet 6'. The two elements of the sensor are each located in relative proximity on one of the limbs 5, 5', to allow corresponding measurement. The limbs 5, 5', in turn, are so designed that they rest against the bubble skin 3 on the inner side thereof. Lugs 11 which rest internally on the bubble skin 3 and through which the end of the limb may penetrate for guidance are provided here. However, the limb 5 is not fixed with respect to the bubble skin, a movement substantially at right angles to the length of the lug 11 still being possible, to allow corresponding compensation in length. In this embodiment, the limbs 5, 5' are then connected to the bubble and fixed in their seam region on the articulation 13.

A further variant is also possible, in which the limb ends are securely connected, for example injection-molded, stuck or welded, on the bubble skin 3 in the lug region, and the articular region 13 is then free and allows compensation in length.

The sensor formed by Hall-effect sensor 6 and magnet 6' or the sensor device is connected to data lines or supply lines 10 guided through the bubble skin 3. The end of the limb 5 resting against the bubble skin is curved downwards 12 to prevent hooking or damage to the skin.

Figure 3:
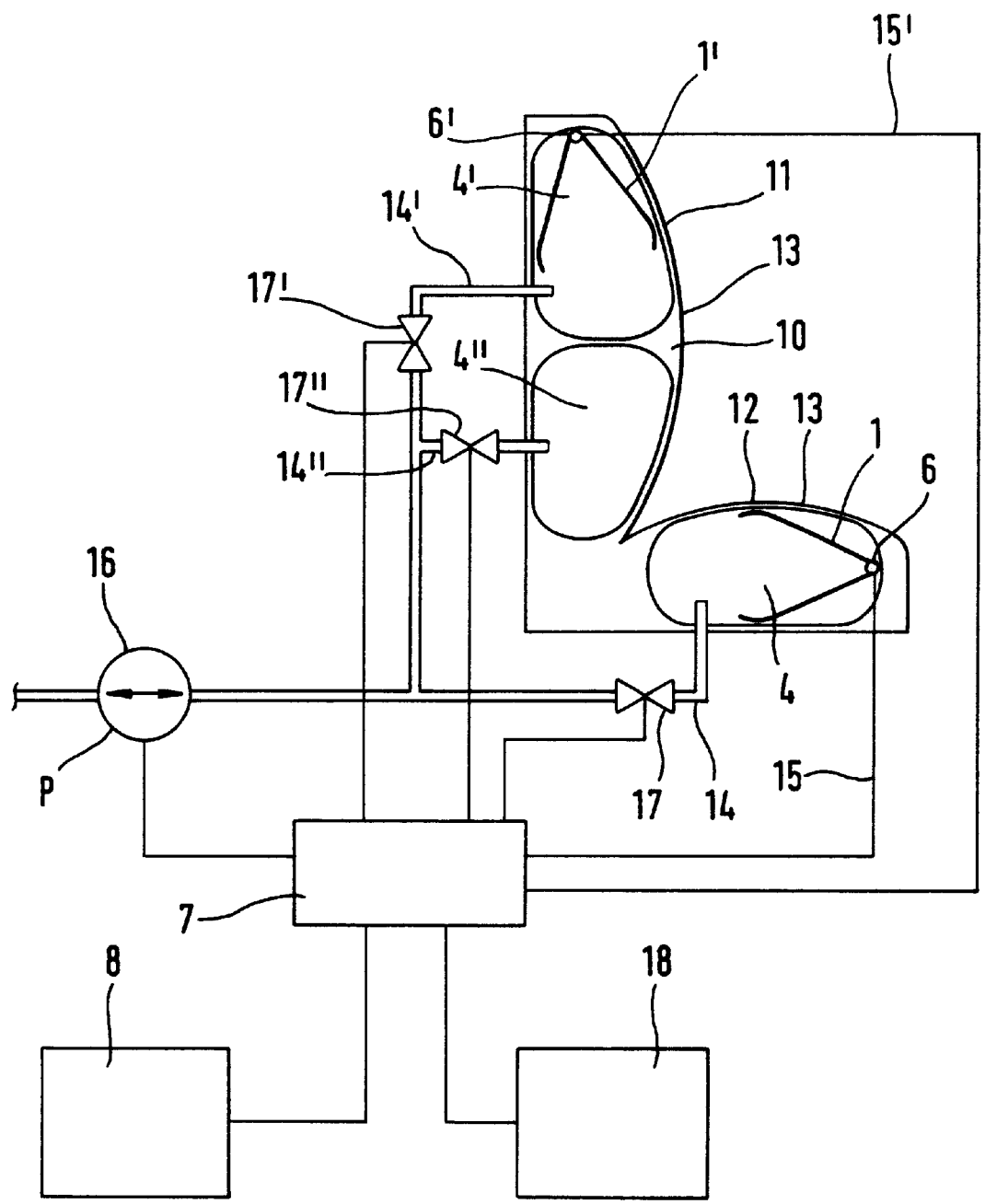
FIG. 3 is a block diagram of a seat according to the invention.

A further block diagram of the invention is shown in FIG. 3. The seat 10 has a backrest 11 and a seat pan 12. There is a plurality of bubbles 4, 4', 4" below the respective seat surface. The surface contour of the seat surface 13 is formed in accordance with the degree of filling of the bubbles 4, 4', 4".

In the example shown here, the bubbles 4, 4' each contain a measuring device 1, 1'. The measuring device is designed in the manner described hereinbefore. The contents of the bubbles 4, 4' may also be introduced or removed through a pipe 14, 14'.

The mode of operation of the seat according to the invention with the system also according to the invention is as follows:

The measuring device 1 in the bubble 4 provided in the seat pan 12 produces, via the sensor 6, either a corresponding distance value or load information which is conveyed to the control means 7 via the data line 15, 15'. The control means 7 optionally also comprises a memory 8 in which, in particular, parameters for producing a corresponding usage profile are input. The control means 7 may also be modular in design as a monitoring unit.

The control means 7 acts via the air supply 16, for example a bilaterally acting pump, in such a way that the bubbles 4, 4', 4" attached to the air supply 16 are either filled or emptied. For filling purposes, a plurality of valves 17, 17', 17" which may each be controlled by the control means 7 are fitted in the respective lines 14, 14', 14".

It is possible to provide mere measurement bubbles which are bubbles having only a measuring device and not a means for filling or emptying via a media pipe. The seat according to the invention may however also contain bubbles 4" which do not contain a measuring device. Their contour is then detected and adjusted indirectly, for example via the other measuring device 1'.

The above-described embodiment is produced, for example, for adjusting a specific usage profile. In a variant, however, the invention also allows only load information to be read out via the sensors 6, and the control means 7 relays corresponding information to a further vehicle component, for example the air bag 18. It is therefore possible, if the air bag is required, to adapt its functionality to the person occupying the seat 1. The sensor 6 does not output a (continuous) measured value in this case, but gives only load information such as the decision "seat is loaded" or "seat is not loaded". According to the invention it is also possible to evaluate or consider a large amount of further vehicle information such as vehicle speed, transverse acceleration (for example round bends), traction and/or braking power. It is therefore possible to produce both an active and a passive seat, depending on the design of the control means 7.

The claims filed now with the application and at a later stage are intended to be drafted without prejudice to further-reaching protection.

The references in the dependent claims relate to the development of the subject of the main claim by the features of the respective sub-claim. However, they should not be understood as the relinquishing of independent substantive protection for the features of the related sub-claims.

Features formerly disclosed only in the description may be found, in the course of the proceedings, to have inventive significance, for example for restriction from the prior art.

What is claimed is:

1. A measuring device for monitoring at least one dimension of a bubble containing a medium, the bubble having a skin and the device comprising at least one feeler associated with said skin, wherein, said device further comprises a sensor which cooperates with said at least one feeler to determine the respective position of said feeler relative to a reference and outputs a signal corresponding to the detected distance between said at least one feeler and said reference.

2. The measuring device as claimed in claim 1, wherein, said sensor is arranged to output a signal representative of the value of said detected distance between said at least one feeler and said reference.

3. The measuring device as claimed in claim 1, wherein, said sensor is arranged to output a signal indicative that a change in said detected distance between said at least one feeler and said reference of a predetermined amount has occurred.

4. The measuring device as claimed in claim 1, wherein, said at least one feeler rests against said bubble skin.

5. The measuring device as claimed in claim 1, wherein, said at least one feeler is embedded in said bubble skin.

6. The measuring device as claimed in claim 1, wherein, said at least one feeler is embedded in a material surrounding said bubble skin.

7. The measuring device as claimed in claim 1, wherein, said reference is provided by a further feeler associated with said bubble skin.

8. The measuring device as claimed in claim 7, wherein, said further feeler rests against said bubble skin.

9. The measuring device as claimed in claim 7, wherein, said further feeler is embedded in said bubble skin.

10. The measuring device as claimed in claim 7, wherein, said further feeler is embedded in a material surrounding said bubble skin.

11. The measuring device as claimed in claim 7, wherein, said feelers are arranged on respective interconnected fork-like limbs.

12. The measuring device as claimed in claim 11, wherein, said limbs are rigidly connected to one another and said feelers rest against the bubble skin utilizing internal stress in the limbs.

13. The measuring device as claimed in claim 11, wherein, said limbs are connected to one another in an articulated manner.

14. The measuring device as claimed in claim 13, wherein, a bias means is provided which causes said feelers to rest against said bubble skin.

15. The measuring device as claimed in claim 13, wherein, a lug is provided on said bubble skin, said lug acting to guide at least one of said limbs.

16. The measuring device as claimed in claim 13, wherein, at least one of said limbs is fastened to said bubble skin.

17. The measuring device as claimed in claim 13, wherein, said bubble is surrounded by a material and said at least one of said limbs is fastened in said material surrounding said bubble skin.

18. The measuring device as claimed in claim 11, wherein, the limbs consist of plastics material such as a fiber-reinforced plastics material.

19. The measuring device as claimed in claim 11, wherein, the limbs consist of a metal material such as a metal alloy or spring steel.

20. The measuring device as claimed in claim 11, wherein, the limbs consist of a combination of a plastics material and a metal material.

21. The measuring device as claimed in claim 7, wherein, the feelers are arranged on a scissor-type arm.

22. The measuring device as claimed in claim 7, wherein, said device further comprises a guide and said feelers are displaceably mounted on said guide and said sensor determines the distance of said feelers on said guide.

23. The measuring device as claimed in claim 7, wherein, said feelers are arranged on respective interconnected limbs and said sensor is arranged between said limbs.

24. The measuring device as claimed in claim 7, wherein, said feelers are arranged on respective interconnected limbs and said sensor is arranged at a region of connection of said limbs.

25. The measuring device as claimed in claim 7, wherein, said feelers are arranged on respective interconnected limbs, said limbs being connected in an articulated manner, and said sensor being arranged on said articulation between said limbs.

26. The measuring device as claimed in claim 7, wherein, said feelers are arranged on respective interconnected limbs, said sensor comprising a magnet and a Hall-effect sensor, a first of said limbs carrying one of said magnet and said Hall-effect sensor and a second of said limbs carrying the other of said magnet and said Hall-effect sensor.

27. The measuring device as claimed in claim 1, wherein, said reference is provided by a substantially immobile contact area.

28. The measuring device as claimed in claim 1, wherein, said reference is provided on said skin of said bubble.

29. The measuring device as claimed in claim 1, wherein, said bubble skin has an outer surface and an inner surface and said at least one feeler is arranged on said outer surface of said bubble skin.

30. The measuring device as claimed in claim 1, wherein, said bubble skin has an outer surface and an inner surface and said at least one feeler is arranged on said inner surface of said bubble skin.

31. The measuring device as claimed in claim 1, wherein, said measuring device is arranged inside said bubble.

32. The measuring device as claimed in claim 1, wherein, said sensor is a Hall-effect sensor with a magnet.

33. The measuring device as claimed in claim 1, wherein, said sensor is a capacitive or inductive sensor, a piezocrystal, an ultrasonic sensor, an eddy current distance pickup, a potentiometer, an optical or electronic sensor, a strain gauge or the like.

34. The measuring device as claimed in claim 1, wherein, the sensor comprises a magnet and a Hall-effect sensor, the Hall-effect sensor being associated with one of said at least one feeler and reference, the magnet being associated with the other of said at least one feeler and reference.

35. The measuring device as claimed in claim 1, the at least one feeler being mounted on a limb, and the sensor comprising a strain gauge mounted on said limb and which measures the bending of said limb.

36. The measuring device as claimed in claim 1, wherein, the device further comprises means for determining the prevailing pressure of said medium in said bubble.

37. The measuring device as claimed in claim 1, wherein, the device further comprises means for determining the prevailing temperature of said medium in said bubble.

38. The measuring device as claimed in claim 1, wherein, said output of said sensor is transmitted to an associated control means by way of data lines.

39. The measuring device as claimed in claim 38, wherein, said sensor is arranged inside said bubble and said data lines pass through said bubble skin.

40. The measuring device as claimed in claim 39, wherein, a tight bushing is provided in said bubble skin for receiving said data lines.

41. The measuring device as claimed in claim 40, wherein, said sensor is also connected to an external power supply by means of power supply lines received in said bushing.

42. The measuring device as claimed in claim 1, wherein, said sensor is arranged inside said bubble and wireless means are provided for transmitting data from said sensor to an associated control means arranged externally of said bubble.

43. A system for adjusting a contour of a surface, the system comprising one or more bubbles having a contour arranged beneath said surface and the contour of the bubbles producing said surface contour, wherein, at least one of said bubbles is provided with a measuring device as claimed in claim 1, the system further comprising control means arranged to vary the contour of at least one of said bubbles by selectively introducing a quantity of medium into said bubble or removing a quantity of said medium from said bubble, in dependence on the difference between the value of the output signal of said sensor and a set value.

44. The system for adjusting a contour of a surface as claimed in claim 43, wherein, said medium is a gas such as air or a gaseous mixture.

45. The system for adjusting a contour of a surface as claimed in claim 43, wherein, the medium is a liquid.

46. The system for adjusting a contour of a surface as claimed in claim 43, wherein, not every bubble of the arrangement has a measuring device and said control means determines the corresponding surface contour between various bubbles.

47. The system for adjusting a contour of a surface as claimed in claim 43, wherein, said control means is provided with a data store for various surface contours and a respectively selected contour is activated by said control means by a corresponding control input.

48. The system for adjusting a contour of a surface as claimed in claim 43, wherein, said control means comprises a timer, said control means being arranged vary the contour of said bubble only after a predetermined delay following detection of a difference between said value of the sensor output signal and said set value.

49. The system for adjusting a contour of a surface as claimed in claim 43, in which the surface contour is a surface contour of a seat.

50. A seat comprising at least of a seat surface for supporting an occupant of the seat, said seat surface comprising a seat pan and a back rest arranged thereon, said seat further comprising means for changing at least part of the contour of the seat surface facing the occupant, wherein, the means for changing at least part or the contour of the seat surface comprises a system for adjusting a surface contour as claimed in claim 43.

51. The seat as claimed in claim 50, wherein, after a defined adjustment of said seat contour, the measurement value of at least one of said bubbles as measured by a respective measurement device is stored in a memory of said control means.

52. The seat as claimed in claim 51, wherein, said control means is adapted to use said stored measurement values to effect a repeatable adjustment of the seat contour.

53. A system for detecting a load on a surface wherein, one or more bubbles containing a medium are provided beneath said surface such that a load on the surface causes a change in the shape of at least one of said bubbles, the system further comprising a measuring device as claimed in claim 1 and a monitoring device, said measuring device being arranged to detect a change in shape of said at least one of said bubbles and to output a signal corresponding to said change to monitoring device.

54. A seat comprising at least of a seat surface for supporting an occupant of the seat, said seat surface comprising a seat pan and a back rest arranged thereon, wherein, the seat further comprises a system for detecting a load on said seat surface arranged and constructed in accordance with the system for detecting a load on a surface as claimed in claim 53.

55. The seat as claimed in claim 54, wherein, said monitoring device is adapted to evaluate said measurement values to establish how the seat is stressed.

56. The seat as claimed in claim 55, wherein, the system further comprises means for detecting the prevailing pressure and temperature of said medium in said at least one bubble, said detection means being adapted to output signals representative of said prevailing pressure and temperature to said monitoring device, said monitoring device being adapted to use said output signals to establish how the seat is being stressed.

57. The seat as claimed in claim 56, wherein, the system further comprises a memory, said monitoring device being adapted to store the output signals from said measurement device and said pressure and temperature detection means to said memory and to allocate various stress profiles to the sets of values stored.

58. A vehicle comprising a seat as claimed in claim 57 and a control, wherein, said control is adapted to use said determined stress profiles to control one or more vehicle elements, such as an air bag.

59. The vehicle as claimed in claim 58, wherein, said control is adapted to receive and evaluate data concerning further parameters of the vehicle such as the vehicle speed, the transverse acceleration, the traction and braking power.

60. A seat comprising at least of a seat surface for supporting an occupant of the seat, said seat surface comprising a seat pan and a back rest arranged thereon, said seat further comprising means for changing at least part of the contour of the seat surface facing the occupant, at least one bubble arranged beneath said seat surface and a measuring device as claimed in claim 1.

61. The seat as claimed in claim 60, wherein, said measuring device defines the contour of said seat surface.

62. The seat as claimed in claim 60, wherein, said measuring device determines the loading of the seat surface.

* * * * *